United States Patent [19]

Darnall, Jr.

[11] 4,368,530
[45] * Jan. 11, 1983

[54] ACOUSTIC DAMPENING ASSEMBLY FOR RECORD PLAYER TURNTABLE

[76] Inventor: Tom A. Darnall, Jr., Rte. 6, Box 404, Buckhannon, W. Va. 26201

[*] Notice: The portion of the term of this patent subsequent to May 13, 1997, has been disclaimed.

[21] Appl. No.: 148,292

[22] Filed: May 9, 1980

Related U.S. Application Data

[63] Continuation of Ser. No. 904,788, May 11, 1978, Pat. No. 4,202,551.

[51] Int. Cl.³ .............................................. G11B 3/60
[52] U.S. Cl. ................................................... 369/264
[58] Field of Search ................... 274/39 R, 39 A, 1 R; 369/264, 266

[56] References Cited

U.S. PATENT DOCUMENTS

| | | | |
|---|---|---|---|
| 1,193,995 | 8/1916 | Collins | 369/264 |
| 1,663,566 | 12/1915 | Scottord | 274/39 R |
| 1,823,533 | 9/1931 | Diehl | 274/39 R |
| 2,115,863 | 5/1938 | Lichten | 274/39 R X |
| 2,135,035 | 11/1938 | Heacock | 274/39 R X |
| 2,658,762 | 10/1953 | Begun | 274/1 R X |
| 3,214,177 | 10/1965 | Geiger | 274/39 A |
| 3,241,840 | 3/1966 | Freier | 274/39 |
| 3,346,262 | 10/1967 | Reed | 274/39 R |
| 3,510,137 | 5/1970 | Freier | 274/39 R X |
| 3,973,778 | 8/1976 | Marks et al. | 274/39 R X |
| 3,984,112 | 10/1976 | Marks et al. | 274/39 R |
| 4,047,721 | 9/1977 | Hermann | 369/266 |
| 4,202,551 | 5/1980 | Darnall | 274/39 R |

FOREIGN PATENT DOCUMENTS

| | | | |
|---|---|---|---|
| 2658993 | 6/1978 | Fed. Rep. of Germany | 369/264 |
| 336794 | 10/1930 | United Kingdom | 369/264 |
| 419324 | 11/1934 | United Kingdom | 274/39 A |
| 1320894 | 6/1973 | United Kingdom | 274/39 A |
| 2032676 | 5/1980 | United Kingdom | 274/42 R |

*Primary Examiner*—Charles E. Phillips
*Attorney, Agent, or Firm*—DePaoli & O'Brien

[57] ABSTRACT

An acoustic dampening assembly of decoupling devices for blocking, absorbing, and deadening collision course vibrations. These decoupling devices are disposed: (a) where vibrations can be picked up by a component of the equipment from the surrounding air, (b) athwart each path of travel for vibrations through the component and particularly to and from another component, and (c) in parallel to complex resonating vibrations within associated components, for diminishing, absorbing, and blocking the transfer of such vibrations. These devices include elastomeric mounts which maintain rotating components in the rigid alignment required by design considerations, energy absorbing layers on flat surfaces, isolated sandwich cushions at points of load-bearing contact, compressing devices that produce radially-directed inward pressures, and a ballast that produces a total decoupling of the record from the turntable mechanism during play of the record.

3 Claims, 12 Drawing Figures

ACOUSTIC DAMPENING ASSEMBLY FOR RECORD PLAYER TURNTABLE

This is a continuation, of application Ser. No. 904,788 filed May 11, 1978 now U.S. Pat. No. 4,202,551.

BACKGROUND OF THE INVENTION

1. Field of the Invention

This invention relates to record player turntables and particularly relates to devices for dampening, dissipating, and blocking vibrations and resonances that interfere with faithful sound reproduction.

2. Review of the Prior Art

Playback distortion from the turntable frequently occurs in even the finest equipment. It may be an obvious distortion which makes listening very unpleasant, an objectionable resonant coloration, a blurring of clear, distinct sound into an unrecognizable mass of sound, a subtly annoying but not totally unpleasant effect, or even an unidentifiable source of fatique. Mechanical vibration in a turntable may originate in, or be transmitted by, the drive system, the loader assembly, the platter design, or the chassis design.

Feedback is a major source of mechanical vibration which may be either mechanical or acoustical. Mechanical feedback is energy transmitted through the floorboards and to the wall beams and the like so that the loudspeaker is mechanically coupled to the turntable. Acoustical feedback is created by acoustical energy emanating from the loudspeaker or other sources when it moves or pumps energy into the room in the form of low-to-high level pressures at multiple frequencies and in complex patterns and with changing forces. A mechanical force is thus created when the pressure patterns in the air are absorbed by solid objects.

The lower the frequency, the more obvious the mechanical force becomes until it reaches a frequency too low to be heard. But even at such low frequencies, sufficient energy can be absorbed to rattle windows and shake walls as well as to create mechanical energy in the turntable platter, its main board, its base, and its supporting structure. Each of these parts vibrates with its own characteristic resonances in accordance with varying amounts of acoustical energy in the room.

These mechanical and acoustical vibrations travel through the equipment and coincide from all directions at certain key pathways to the tone arm. The result of such combination seems to be a compounded increase in the feedback to the tone arm at many key points which might be called "collision course vibrations". These collision course vibrations are also generated within the mechanism itself, by and between the motor and the main bearing and the chassis and the subchassis, and are transmitted to and picked up by each end of the tone arm.

Such vibrations are commonly measured in the laboratory as rumble. Rumble is a low-pitched vibration or frequency that is caused by a mechanical vibration acting on the turntable and tone arm when the vibration occurs at the rotation frequency of the motor, the idler, the bearing, or the platter, or at some multiple of any of these frequencies. The platter bearing is indeed the main source of rumble in turntables that are now available on the market. Rumble may be reported as weighted or unweighted. Weighted rumble measurements discriminate against subsonic frequency components which cannot be reproduced by loudspeakers or heard by the human ear, but such frequencies can overdrive an amplifier or speaker and thereby impair the reproduction of higher frequencies. Thus, an unweighted measurement can also provide useful information because both sonic and subsonic frequencies—from one to 100,000 cps—contribute undesirable side effects.

Flutter is a rapid pitch fluctuation in reproduced music which is caused by pulsations or changes of the turntable speed, i.e., a rapid variation from constant rotational speed. When flutter occurs at a low rate, it is called "wow", suggesting the characteristic sound it imparts to steady musical tones. When it occurs at higher rates, the effect is of a "gargling" or roughness. Wow and flutter are usually reported as a combined flutter measurement which is weighted to emphasize the most objectionable flutter rates at around 5–10 Hz. This combined flutter measurement is usually specified in hundredths of a percent of perfect accuracy with 0.03% being a typically good figure.

Flutter robs a musical instrument of its character by blurring the musical image. Flutter can be characterized as forward and backward movement. The composite of all of these vibrations creates a situation that has much the same distortional effect, with respect to playback, as flutter itself but with more severe characteristics because these vibrations react in all planes and in 360°.

Even though such laboratory measurements report excellent values, such as an average peak wow and flutter of not more than ±0.03% and a rumble low enough to produce an ARLL-weighted measurement of −73 db or even −80 db, collision course vibrations can produce annoying disturbances to the trained ear. Neither is consequently acceptable for quality equipment.

Numerous devices have been designed and built for decoupling the turntable from mechanical vibrations. However, the frequency at which the energy decoupler resonates must be above the rotational speed of the turntable, which at 33⅓ rpm is approximately one-half cycle per second, and at the same time, must be lower than the resonant frequency of the tone arm mass and cartridge compliance, which is preferably 8 or 9 cycles per second. Thus, the best frequency for decoupling mechanical energy to the turntable is two or three cycles per second. Such decouplers include the use of a dense, thick, massive support board, upon which the turntable is placed, and the use of a number of coil springs between the support board and the platform therebeneath. Adding additional mass to the frame of the turntable also changes its frequency of vibration and reduces distortion that may range from frizzy highs to muddy lows, e.g., that is, music "out of focus".

About twenty years ago, a turntable having excellent acoustical qualities is believed to have been advertised. This turntable featured a centering pin that expanded for precisely centering a record and remained in place during play.

U.S. Pat. No. 1,163,566 teaches the use of a layer of sponge rubber, which is secured to a fabric stretched over the revolving platter, and upon which the record is placed.

U.S. Pat. No. 1,823,533 discloses sound deadening materials such as cork washers which surround the central shaft and support the platter.

U.S. Pat. No. 2,353,763 shows an apparatus for supporting the driving motor on vibration insulating washers between coil springs and attaching the turntable shaft to the turntable with a soft rubber washer and an oil-retaining felt washer beneath.

U.S. Pat. No. 3,214,177 describes a dampening and isolating means in combination with a horizontally mounted, ball-type, flush-type anti-friction bearing which reduces both lateral and vertical rumble vibrations from the turntable to −80 db below 0 level. This disclosure points out that modern sound pick-up means, enormously amplified by modern, extremely high-gain, wide-frequency range amplifiers, are superimposed with the reproduced sound as turntable rumble sound vibrations which modulate with and hence impair the clarity of the reproduced sound so as to be extremely disturbing to the listener. While using dampening washers above and beneath the mounting plate and between the mounting plate and the spindle, turntable rumble was found to become practically inaudible when tested with the prescribed RIAA equalization for a test record.

U.S. Pat. No. 3,058,790 teaches the elimination of wow by use of neoprene washers for minimizing vertical movement of the turntable.

U.S. Pat. No. 3,984,112 discloses the use of a synthetic elastic rubber-like plastic material as a mat which covers the top of the platter and its edges, being moldably fitted thereto so that the cover mat is secured to the platter without using an adhesive which can deteriorate. The record is supported on the mat by a pair of annular ridges. However, this mat would not isolate the record from platter resonances.

U.S. Pat. No. 3,997,174 describes a flat hollow-mat containing a visco-elastic fluid which imparts vibration-dampening properties and accomodates warped records.

U.S. Pat. No. 4,012,048 describes a recording disc having concentric rings of soft rubber and a central circular section of an acoustic dampening material such as soft butyl rubber which functions as an adapter and insulates the record from the spindle.

With all of these improvements, *Audio* of June 1977 reported on page 38 as follows:

"Many attempts have been made to isolate or decouple the turntable mechanically from the room via springs or rubber mounts. Some have been moderately successful, others are a sham. Only in a very few cases have they been totally successful in properly decoupling the turntable from mechanical vibrations, and most have been unsuccessful in removing the previously described acoustic feedback problems."

There is accordingly a need for a simple, generally applicable, and efficient decoupler for collision course vibrations.

SUMMARY OF THE INVENTION

It is therefore an object of this invention to provide a decoupler for collision course vibrations in a turntable or changer having direct drive, belt drive, or any other type drive.

It is another object to provide a decoupling system having a synergistic result by its applicability to a wide range of both acoustic and mechanical feedback.

It is further an object to provide a two-stage platter comprising a plurality of external and internal absorption, deadening, and decoupling devices.

It is additionally an object to provide a means for centering a record and for detaching the spindle from the record while the record is being played.

According to these objectives and the principles of the invention, an acoustic dampening assembly is hereinafter described which functions as an efficient decoupler for collision course vibrations in a wide variety of turntables and over a wide range of frequencies. It comprises a main bearing decoupling assembly, a motor decoupling assembly, a platter assembly, a mat assembly, and a record centering means.

The main bearing decoupling assembly comprises a bearing plate and a plurality of load-bearing attachments which permit contact of the bearing plate with the platter support plate only through elastomeric pads and washers while furnishing rigid support to the bearing plate and acting as decoupling devices.

The motor decoupling assembly comprises a plurality of suspension attachments which permit contact of the mounting support plate with the base plate supporting the motor only through elastomeric pads and washers while furnishing rigid support to the motor and its shaft and acting as decoupling devices.

The platter assembly comprises an inner platter, which is also the drive drum, an outer platter, and a plurality of decoupling devices. The decoupling devices for the inner platter comprise inner dampening layers, frequency absorbing cushions for supporting the outer platter thereabove, a circumannular compressor, and a stub-like spindle. The decoupling devices for the outer platter comprise dampening layers for the upper and lower surfaces, deadening material on the lower dampened surface, and a circumannular compressor.

The mat assembly comprises a lower mat, an upper mat, and a center ballast. The lower mat comprises an annular support rib and an aperture guide rib. The upper mat comprises outer and inner guide ribs. The center ballast is a lead disc encased in an elastomeric material; it may have a central hole for centering or be solid.

The record centering means comprises a centering pin having a means for effecting firm contact of the surface of the pin with the edge of the center hole of the record while loading and for spacing the pin surface from the center hole edge during play of the record.

In combination, these devices forming the acoustic dampening assembly of this invention isolate, block, and decouple all collision course vibrations and prevent synergistic combinations thereof. In addition, the top of the spindle is removed so that it is below the center hole of the record. Particularly with new flexible discs, the combination of this invention prevents air from entering between the record and the upper mat and between the upper and lower mats. It also comprises a sound absorbing layer and a vibration dampening layer on resonant-prone surfaces that are exposed to outside vibrations. The compressors absorb and dampen any vibrations and resonances that are absorbed by the metal platter and drive drum. In combination, this assembly of deadening, dampening, and decoupling devices absorbs vibrations, limits them to the portion of the turntable where they are picked up or generated, and/or prevents their combination with other vibrations and resonances. As a result, the collision course vibrations and resonances are completely isolated from the tone arm. Thus, the degree of wow, flutter, and rumble, as generally measured in the laboratory, and additional vibrations that are subtly picked up by the stylus and then amplified, are entirely removed from a turntable equipped therewith. Indeed, the type of flutter that is eliminated by this invention is believed never to have been measured in a laboratory, for it involves 360° in all planes of flutter.

The acoustic dampening assembly of this invention is a combination of vibration decoupling devices which are useful with any turntable or changer of the prior art, whether idler, belt, or direct driven, or even fluid drive or magnetic drive. In contrast to prior art attempts to control playback distortion with one or a few decoupling devices, this invention places a decoupling device: (a) at each location where vibrations can be picked up or generated by a component of the equipment, (b) along each path of travel through the component, and (c) in positions to absorb frequencies that are travelling through the component and which are causing resonance thereof. By such a combination of devices, this invention prevents pick-up and generation of either mechanical or acoustical feedback by a component of the turntable, prevents travel of such frequencies through the component and between adjoining components or absorbs them during such travel, and, above all, prevents synergistic or compounded combinations of such frequencies, i.e. collision course vibrations, at points where they meet during such travel.

DESCRIPTION OF THE PREFERRED EMBODIMENT

The acoustic dampening assembly of this invention is illustrated in the drawings on a belt-driven turntable such as the Thorens TD-126C Isotrack, sold in the United States by Elpa Marketing Industries, Inc., New Hyde Park, N.Y. 11040. This turntable is constructed by mounting the tonearm and platter on independent chassis which are individually shock mounted on a sub-chassis housing the drive system and controls so that the tonearm is protected against shocks when the controls are operated. The equipment is advertised as having a virtual absence of vibration, particularly because of precision-polished, self-lubricating bearings on the platter, whereby acoustic feedback is minimized.

Figure 1:
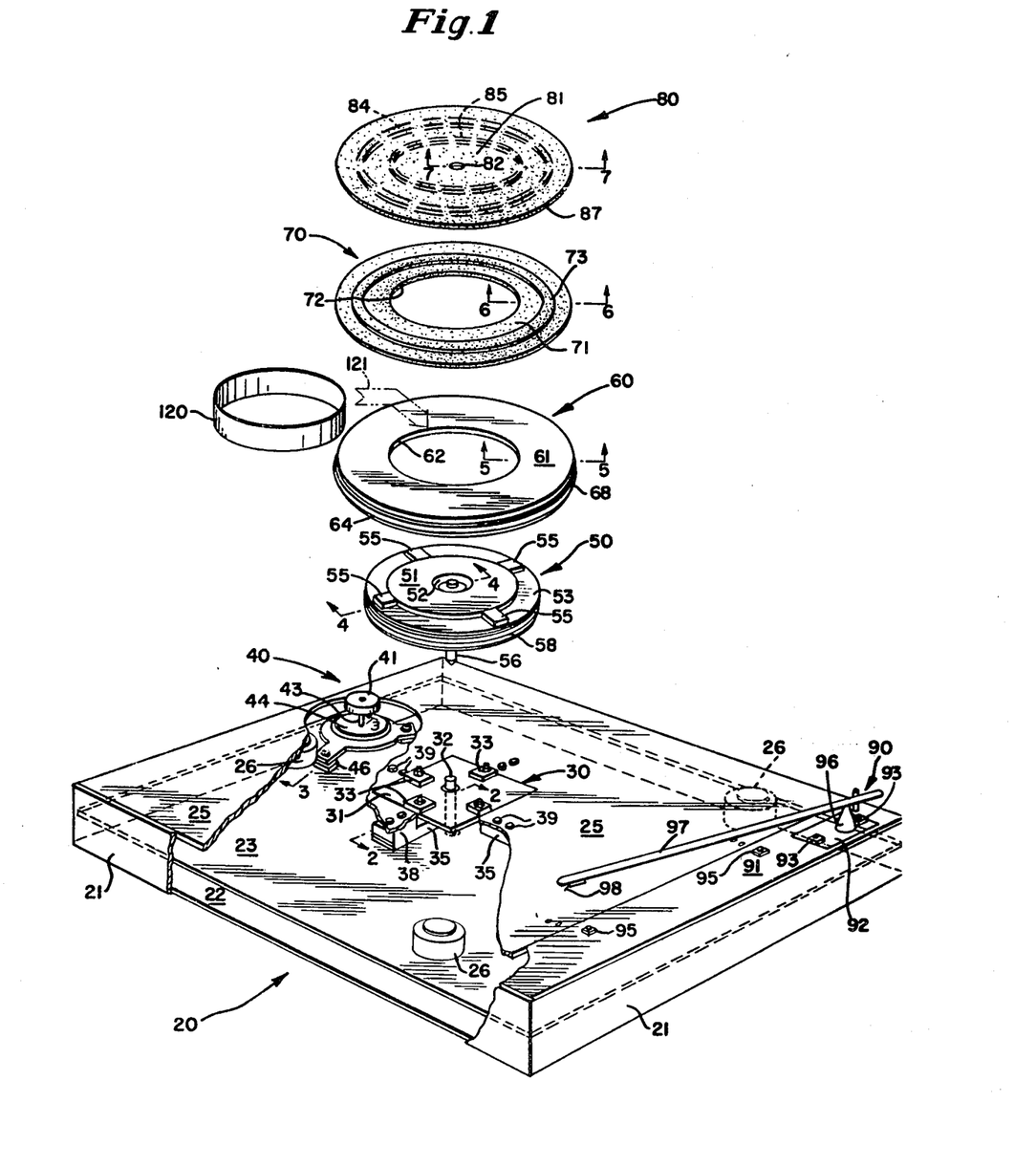
FIG. 1 is an exploded isometric view of a belt-drive turntable of the prior art which is equipped with the acoustic dampening assembly of this invention.

FIG. 1 shows a turntable base assembly 20, comprising sides 21, a base or sub-chassis 22, a mounting support plate or chassis 23, and a platter support plate 25 which is attached to and supported by the plate 23 with at least three shock mounts 26, for which coil springs can be substituted, as is known in the art. Platter support plate 25 floats free of all sides 21.

The turntable base assembly 20 also comprises a tonearm assembly 90 which comprises a tonearm support plate 91 which is independently shock-mounted with decoupling devices 95 on platter support plate 25, a tonearm plate 92 which is attached with decoupling devices 93 to tonearm support plate 91, a tonearm post 96 which is rigidly attached to tonearm plate 92, and a tonearm 97 which has a stylus 98. Except for decoupling devices 95, there is no contact between plates 25 and 91.

Figure 2:
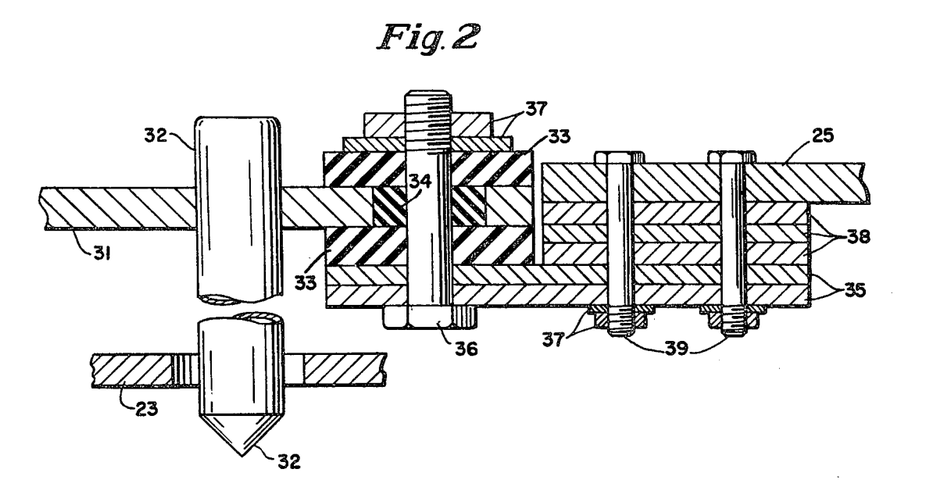
FIG. 2 is a detailed sectional elevation of the main bearing decoupling assembly which is taken in the direction of arrows 2—2 in FIG. 1.

The main bearing decoupling assembly 30 isolates the main bearing from platter support plate 25. It comprises a bearing plate 31, a bearing cylinder 32 which is rigidly attached to plate 31 and extends through plate 31 and a hole in plate 23, without contacting the edges thereof, and four decoupling devices.

Each of these comprises, as clearly shown in FIG. 2, an elastomeric pad 33 above and below plate 31, a bolt 36, a nut and washer 37, an elastomeric collar 34 which surrounds bolt 36 and isolates it from plate 31, a pair of load plates 35 which are held by bolt 36 against lower pad 33, a plurality of mounting bolts 39, and a plurality of mounting plates 38 which are held by bolts 39 and associated washers and nuts 37 against and underside of plate 25. These four decoupling devices thereby maintain plate 31 in rigid relationship with plate 25 while completely absorbing mechanical and acoustical feedback being transmitted from plate 31 to plate 25 and from plate 25 to plate 31.

Figure 3:
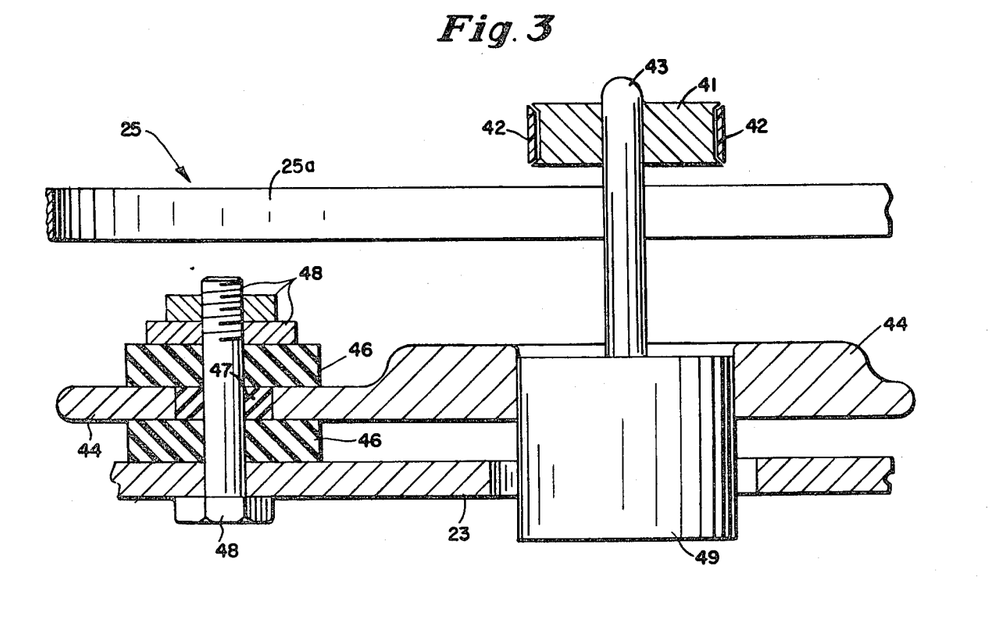
FIG. 3 is a detailed sectional elevation of the motor decoupling assembly which is taken in the direction of arrows 3—3 in FIG. 1.

The motor decoupling assembly 40 isolates motor 49 from mounting support plate 23. As shown in FIGS. 1 and 3, a motor shaft 43 is rigidly attached at its upper end to a pulley 41, around which a belt 42 moves, and at its lower end to a motor 49 which is mounted within a sufficiently large hole in plate 23 that contact of plate 23 with the side of motor 49 does not occur. Platter support plate 25 is also provided with a large enough opening, having sides 25a, that the entire assembly 40 can be lifted therethrough.

Motor base plate 44, which is a part of the frame for motor 49, is held above plate 23 by a plurality of decoupling devices attached to projecting lugs or arms, three being indicated in FIG. 1. Each decoupling device comprises a bolt, washer, and nut 48, a pair of elastomeric pads 46, and an elastomeric collar 47 which surrounds the bolt 48 between the pads 46 for isolating the bolt 48 from the lug 45. Each lower pad 46 is in compression between a lug of base plate 44 and plate 23.

In combination, the three decoupling devices of motor decoupling assembly 40 maintain shaft 43 in rigidly perpendicular relationship to plate 23 while absorbing all mechanical and acoustical feedback that is moving through plate 23. These decoupling devices also prevent motor shock waves from travelling from motor base plate 44 to mounting support plate 23 and thence up through shock mounts 26 to platter support plate 25 and thence to bearing plate 31 and tonearm support plate 91 and from plate 31 to inner platter 50 and from plate 91 to tonearm 96 and stylus 98.

Figure 4:
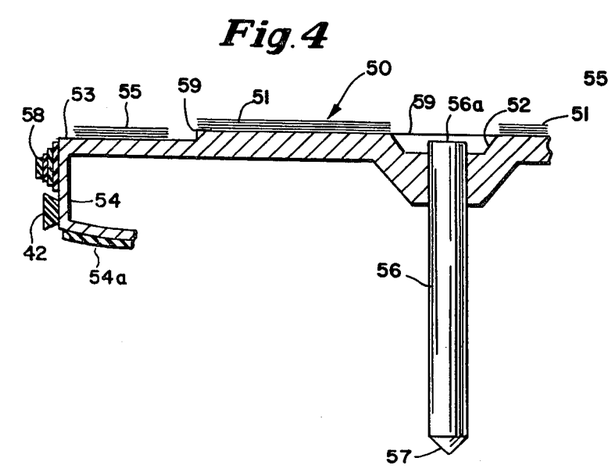
FIG. 4 is a detailed sectional elevation of a portion of the inner platter, showing the decoupling devices therefor, which is taken in the direction of arrows 4—4 in FIG. 1.

The inner platter decoupling assembly 50 comprises a finely polished point 57 on the shaft 56, a depressed shaft top 56a (below the aperture edges 52 and considerably below the record), a plurality of layers of energy absorbing material 51 (such as masking tape) on its inner top surface 59 of the inner platter, a plurality of sandwich cushions 55 which are spaced around the periphery of the drum on its peripheral top surface 53, and a compressor 58 on the outer surface of side 54, immediately above the drive belt 42. An elastomeric layer 54a, as is known in the art, is also provided on the lower outer surface of circumferential side 54.

Figure 4A:
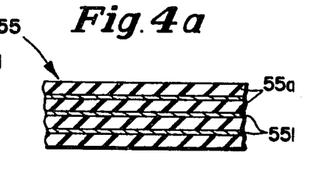
FIG. 4a is an enlarged sectional view of one of the sandwich cushions on the inner platter.

The construction of a sandwich cushion 55 is shown clearly in FIG. 4a. It is formed by alternating layers of thin elastomeric material 55a and of very thin metal shim stock 55b which are adhesively secured to each other and to surface 59 with an elastomeric cement. Alternatively, each sandwich cushion 55 can be mechanically secured within a suitable well in surface 53. The thickness of the cushions 55 is distinctly greater than the thickness of the energy absorption material 51, but their top surfaces are at a lower level than the top surfaces of material 51 because surface 59 is at a higher level than surface 53 in order to provide a circumferential shoulder along the outer edge of surface 59 for temporary insertion, as indicated by arrow 121 in FIG. 1, of a self-centering ring 120, which fits snugly against the shoulder near its bottom edge. Against the outer side of ring 120, aperture edge 62 of outer platter decoupling assembly 60 is temporarily abutted when assembling the turntable of this invention in order to achieve substantially perfect centering of the outer platter. The cushions 55 are spaced apart, of equal thickness, and preferably are four in number, although three to six such cushions 55 are satisfactory.

The compressor 58 is suitably formed of a plurality of superposed layers of a strong elastomeric material, such as rings cut from an automobile innertube. By exerting tensional forces around the periphery of the drive drum, compressor 58 creates strong radially directed forces which serve to absorb, diminish, and deaden the acoustical and mechanical feedback that is travelling through the inner platter.

Figure 5:
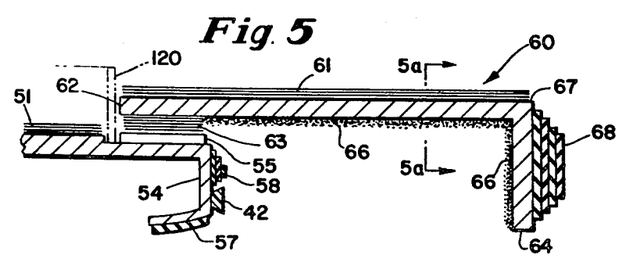
FIG. 5 is a sectional elevation of a portion of the outer platter, taken in the direction of arrows 5—5 of FIG. 1, in combination with a portion of the inner platter.
Figure 5A:
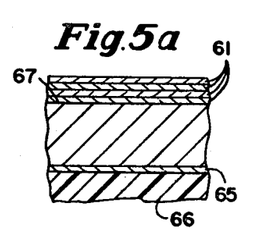
FIG. 5a is a partial sectional elevation through a portion of the outer platter, looking in the direction of arrows 5a—5a in FIG. 5.

The outer platter decoupling assembly 60 comprises a plurality of layers of energy absorbing material 61 (such as masking tape) on the top platter surface 67 which extends from the aperture edge 62 to the outer surface of the circular side 64, an annular band of similar energy absorbing material 63 that surrounds aperture edge 62, a thin layer of energy absorbing material 65 on the lower surface of the platter, a relatively thick layer of energy absorbing material 66 on the material 65, beneath the inner surface of the circular side 64, and a compressor 68 on the circular side 64. Material 65 may by a plurality of layers of masking tape, and material 66 is preferably automobile undercoating.

Figures 6, 7:
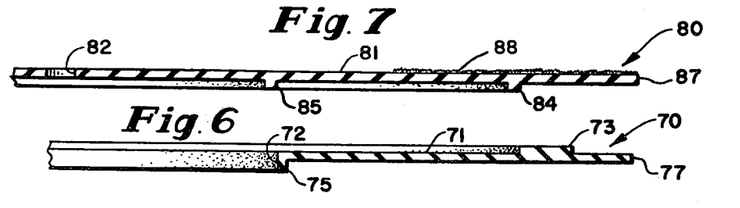
FIG. 6 is a sectional elevation, in part, of the lower mat, taken in the direction of arrows 6—6 in FIG. 1.
FIG. 7 is a sectional elevation, in part, of the upper mat, taken in the direction of the arrows 7—7 in FIG. 1.
Figure 8:
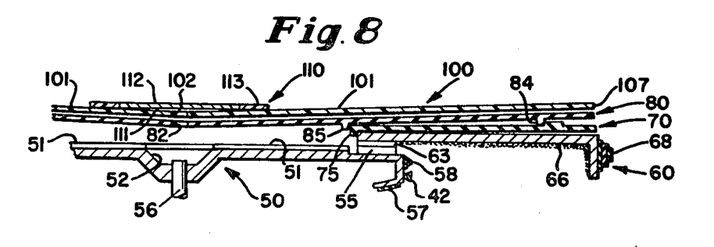
FIG. 8 is a sectional elevation, in part, of the rotating parts of a belt-drive turntable, except for the motor, with a record and ballast in place.

The lower mat 70 is a decoupling device when mounted, as shown in FIG. 8, on the platter 60. Its circular aperture guide rib 75, having aperture edge 72 contacts the aperture edge 62 of the outer platter 60. Its flat annular portion 71 is relatively flexible so that it conforms closely to the top surface of energy absorbing material 61. Its circumannular upper guide rib 73 projects beyond the upper surface of portion 71, and its circular outer edge 77 substantially coincides with the outer surface of circular edge 64 when mounted as shown in FIG. 8.

The upper mat 80 is another decoupling device when mounted, as shown in FIG. 8, on the lower mat 70. It is of softer composition than mat 70 and is consequently more flexible. Its circumannular inner guide rib 85 contacts and centers the mat 80 with respect to the circular aperture guide rib 75, and its outer circumannular guide rib 84 also contacts and centers the mat 80 with respect to the guide rib 73, while its circular outer edge 87 coincides with outer edge 77, so that its aperture edge 82 is substantially directly above the top 56a of the spindle or shaft 56 when mounted as in FIG. 8. Mat 80 has fine grooves 88 along the outermost portion of its upper surface.

Finally, as indicated in FIG. 8, a ballast 110, having a disc-shaped lead weight 112 within an elastomeric ring 113, is placed on top of the record 100 and centered over its aperture so that energy-laden air is unable to penetrate into the space beneath the record 100.

When a record 100 is placed on the upper mat 80, as indicated in FIG. 8, its outer edge 107 should coincide with edges 77, 87, and the edge 102 of its aperture or center hole should coincide with or be inside of aperture edges 52 and 82. However, to obtain precise centering, a centering pin should be used. It is an important part of this invention to use a centering device which will enable the record to be centered and which will then be detached from all contact with the spindle or shaft of the turntable.

Alternatively, such centering and detachment can be done with any of three devices. Firstly, a removable centering pin can be inserted and then removed before the record is played. Secondly, a shrink-swell centering and detaching device can be mounted on the spindle to provide precise centering in its swell position, as indicated in phantom in FIG. 9, and to be spaced from aperture edge 102 in its shrink position while remaining in place during play. Thirdly, a double-diameter centering and detaching device can be mounted on the spindle for loading and centering while in its raised position and for detached play while in its lowered position.

Figure 9:
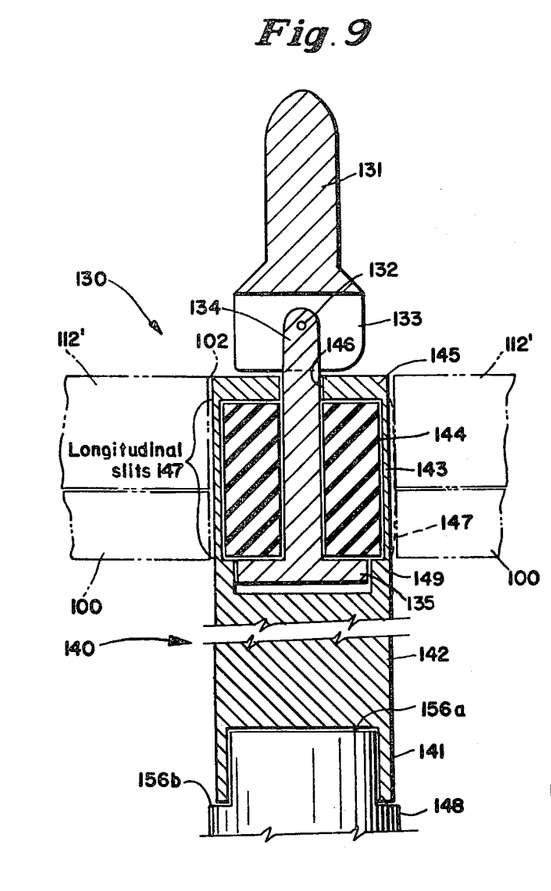
FIG. 9 is a sectional elevation of a shrink-swell centering and detaching device, mounted upon a stub-like spindle of a turntable and in loading position with a record and ballast in phantom.

As indicated in FIG. 9, the shrink-swell centering and detaching device comprises a piston 130 and a centering member 140. The former comprises a lever 131, a pivot 132 that is transversely disposed across a slot having sides 133, and a pressure member comprising a shaft 134 which is rotatably attached to the pin 132 at one end and is rigidly attached to a disc 135 at its other end. The centering member 140 comprises an elongated pin having a cylindrical bottom opening with circular side 141, a solid portion 142, a well with circular sides 149 within which disc 135 slides, a cavity having a thin circular side 143, and a top portion 145 having a central opening with sides 146 within which shaft 134 moves. The circular side 143 is longitudinally slitted to provide a large number of flexible slats 147. An elastomeric collar 144 fits snugly within the cavity inside of circular side 143. The edge 148 of circular side 141 rests against a circular shoulder 156b in the spindle or shaft 156a of the turntable. When a record 100 and a ballast having a load disc 112' with a center hole therein are loaded onto the turntable, the aperture edge 102 of the record is spaced from the slitted circular side 143. When lever 131 is pivoted and disc 135 presses against collar 144, slats 149 are bowed outwardly in a uniform arc to press against circular side 102 and the corresponding side of the hole in the load weight 112' so that precise centering is accomplished. When lever 131 is returned to its upright position, the circular side 143 is completely detached from record 100 and ballast 112'.

Figure 10:
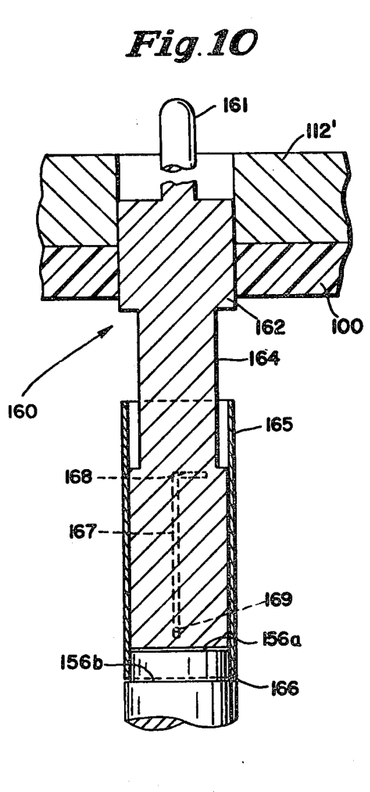
FIG. 10 is a sectional elevation of a double-diameter centering and detaching device, also mounted upon a stub-like spindle of a turntable and in centering position with a record and ballast.

The double-diameter centering and detaching device 160, as seen in FIG. 10, comprises a tube having a circular side 165, within which the top of a stubby spindle or shaft 156a fits, and a pin member having a smaller-diameter portion 164, a larger-diameter portion 162, a handle 161 of smaller diameter, and a radially protruding lug 169. The bottom edge 166 of circular side 165 rests against a circular shoulder 156b in the spindle. An L shaped slot in side 165, formed by a longitudinal portion 167 and a transverse portion 168, receives lug 169. When device 160 is in its lowered position for loading and centering, lug 169 is in the longitudinal portion 167, as indicated in phantom in FIG. 10. When device 160 is in its raised position for playing, lug 169 is in transverse portion 168, near the top of the L-shaped slot, and larger diameter portion 162 is above lead disc 112' and thus completely detached and spaced from record 100 and lead disc 112'.

It is clearly also satisfactory to construct device 160 so that lug 169 is in transverse portion 168 while loading and in the bottom of longitudinal portion 167 while playing so that larger diameter portion 162 is beneath record 100 and is thus completely detached therefrom and from disc 112' while record 100 is playing. However, the construction shown in FIG. 10 is preferred because it enables a record to be more accurately centered.

In combination with the depressed elevation of the stub-like shaft or spindle 156a, any of these three centering and detaching devices is effective for decoupling the drive mechanism from the record, but the shrink-swell embodiment is preferred, and the double-diameter embodiment is highly preferred because either of the preferred devices is less readily lost or misplaced.

The platter support plate 25 is shock mounted to mounting support plate 23 by the shock mounts 26 which are preferably silicone-rubber filled shock mounts or the AT 605 Audio Insulator System, as sold by Audio-Technica, U.S., Inc., Dept. 127A, 33 Shiawassee Ave., Fairlawn, Ohio. The motor can be attached to platter support plate 25 by motor decoupling assembly 40 in any type of turntable, but it is preferable that the motor be shock mounted to a separate sub-chassis, such as plate 23. However, in a direct drive turntable, it is highly desirable that the motor be shock-mounted to platter support plate 25. It is preferable that the platter support plate float free of the main chassis in a direct drive turntable, without any contact with the sides or other parts of the structure.

Better decoupling of vibrations and resonances is attained if more than one elastomeric mat 70, 80 is used, but one mat is feasible, if properly designed. Each of a plurality of such mats should be shock matted to each other. No mat should be allowed to touch the inner platter. In other words, the bottom mat should be cut out at the inner diameter of the outer platter so as not to contact the inner platter.

Only the outermost portion of the top mat should bear the major part of the weight of the record. The remaining portion of the topmost mat should provide hardly more than a stabilizing effect that is created by the air space between each two adjoining mats.

It is an important feature of this invention that the center hole of a record should never contact the spindle during play. In other words, side 102 of the hole in record 100 must not touch the side of shaft 56, either directly or indirectly. It is a part of this invention to attain such isolation by grinding down shaft 56 to a stubby top 56a that is below the hole in record 100 and to provide the necessary centering capability with centering devices on the record-supporting components of the turntable, such a circumannular guides 73, 75, 84, 85, and with removable devices such as ring 120 and centering pins 140, 160 in combination with a ballast having a center hole therethrough.

Because it is believed that: (a) during play, stylus 98 sets up a chattering between record 100 and itself, and (b) airborne resonances also react upon the record, it is a part of this invention to operate a turntable during play with a heavy and non-resonant ballast 110, disposed coaxially upon the record. In combination with the double-mat support of the record by mats 70, 80, which have no contact with the inner platter, the feedback effects of this chatter are substantially eliminated.

The most satisfactory platter assembly comprises an inner platter and an outer platter which are fabricated from non-resonant materials, so that better performance is attained than with any combination of metal alloys. However, with the metallic platter components that are currently available on the market, it is an essential part of this invention that acoustic deadening materials be placed on all surfaces exposed to airborne acoustic energy, that decoupling devices be provided to separate all surfaces exposed to contact with another surface, and that a heavy, non-resonant compressor 58, 68 be provided as a ring around each flange or side 54,64 of the inner and outer platters so that by imposing an inward compressive force upon the platter, all radially aligned resonances are particularly absorbed.

Because innumerable modifications of the preferred embodiment discussed hereinbefore can be made without departing from the principles of this invention, what should be interpreted as the scope of the invention is defined by the following claims.

What is claimed is:

1. In a turntable having a spindle, a motor, an outer platter having a top surface, a lower surface, an aperture, and a circular side, an inner platter having an inner top surface, a peripheral top surface, and a periphery, a platter support plate, and a mounting support plate, said platter support plate being shock-absorbingly attached to and supported by said mounting support plate, the improvement comprising a inner platter decoupling assembly which comprises:

A. a plurality of layers of energy absorbing material on said inner top surface;
B. a plurality of frequency-absorbing sandwich cushions which are disposed on said peripheral top surface for supporting the weight of said outer platter thereupon, and for absorbing vibrations being transmitted between said inner and outer platters;
C. a layer of energy absorbing material on said lower surface; and
D. a circumannular compressor which is tensionally disposed around said circular side to create strong radially directed forces that serve to absorb, diminish, and deaden the acoustical and mechanical feedback that travels through said inner platter during play of a record on said turntable.

2. In a turntable having a spindle, a motor, an outer platter having a top surface, a lower surface, an aperture, and a circular side, an inner platter having a peripheral top surface attached to a plurality of sandwich cushions, and a periphery, a platter support plate, and a mounting support plate, said platter support plate being shock-absorbingly attached to and supported by said mounting support plate, the improvement comprising an outer platter decoupling assembly which comprises:
   A. a plurality of layers of energy absorbing material on said top surface;
   B. an annular band of layers of energy absorbing material that surrounds the edge of said aperture and is disposed to rest upon said sandwich cushions while said outer platter is centered upon and supported by said inner platter; and
   C. a circumannular compressor which is tensionally disposed around said periphery to create strong radially directed forces that serve to absorb, diminish, and deaden the acoustical and mechanical feedback that travels through said outer platter during play of a record on said turntable.

3. In a turntable having a base, a mounting support plate, a platter support plate, a two-stage platter assembly comprising an inner platter and an outer platter having an aperture, and a spindle, the improvement for isolating, blocking, and decoupling collision course vibrations and for preventing synergistic combinations thereof, comprising a mat assembly which comprises:
   A. a lower mat comprising a mat aperture, an upper surface, a circumannular aperture guide rib, surrounding said mat aperture and fitting within said aperture of said outer platter, and a circumannular upper guide rib, which projects upwardly beyond said upper surface of said lower mat;
   B. an upper mat comprising a lower surface, an upper surface, a circumannular inner guide rib, which projects downwardly from the lower surface of said inner mat and also contacts and centers said upper mat with respect to said aperture guide rib, and a circumannular outer guide rib, which projects downwardly from the lower surface of said upper mat and also contacts and centers said upper mat with respect to said upper guide rib; and
   C. a center ballast;

said mats preventing air from entering between said at least one mat and a flexible record placed thereupon and said center ballast being placed on top of said record and centered over the aperture thereof so that energy-laden air is unable to penetrate into the space beneath said record, neither said lower mat nor said upper mat being in contact with said inner platter, and the entire weight of said record being borne solely by the circumannular outermost portion of said upper mat between said outer guide rib and the outer edge thereof.

* * * * *